United States Patent
Correia Da Silva Vilar et al.

(10) Patent No.: US 7,164,468 B2
(45) Date of Patent: Jan. 16, 2007

(54) LIDAR SYSTEM CONTROLLED BY COMPUTER FOR SMOKE IDENTIFICATION APPLIED, IN PARTICULAR, TO EARLY STAGE FOREST FIRE DETECTION

(75) Inventors: Rui Mario Correia Da Silva Vilar, Lisbon (PT); Fernando Simoes, Algueirão (PT); José Lino Vasconcelos Da Costa, Lisbon (PT); Andrei Borisovich Utkin, St. Petersburg (RU); Alexander Lavrov, St. Petersburg (RU)

(73) Assignee: Instituto Superior Tecnico, Lisboa (PT)

( * ) Notice: Subject to any disclaimer, the term of this patent is extended or adjusted under 35 U.S.C. 154(b) by 252 days.

(21) Appl. No.: 10/479,250

(22) PCT Filed: May 31, 2002

(86) PCT No.: PCT/PT02/00010

§ 371 (c)(1), (2), (4) Date: Jul. 12, 2004

(87) PCT Pub. No.: WO03/073128

PCT Pub. Date: Sep. 4, 2003

(65) Prior Publication Data
US 2004/0239912 A1   Dec. 2, 2004

(30) Foreign Application Priority Data
May 30, 2001   (PT) .................................... 102 617

(51) Int. Cl.
*G01C 3/02* (2006.01)

(52) U.S. Cl. ........................ 356/10; 356/5.01; 359/227

(58) Field of Classification Search .................. 356/10
See application file for complete search history.

(56) References Cited

U.S. PATENT DOCUMENTS 5,160,842 A * 11/1992 Johnson .................... 250/338.1
5,225,810 A * 7/1993 Inoue et al. ................ 340/577

(Continued)

FOREIGN PATENT DOCUMENTS

EP   0 978 718 A   2/2000

OTHER PUBLICATIONS

Vilar R et al: "Estimation of required parameters for detection of small smoke plumes by lidar at 1.54mum" Applied Physics B (Lasers and Optics), Aug. 2000, Springer-Verlag, Germany, vol. B71, NR. 2, pp. 225-229 XP002221756 ISSN: 0946-2171 p. 225-p. 228.

(Continued)

*Primary Examiner*—Thomas H. Tarcza
(74) *Attorney, Agent, or Firm*—Sughrue Mion, PLLC

(57) ABSTRACT

This invention relates to a method and an active system for detection and localization of early stage forest fires using lidar. In the simplest configuration the system includes a lidar and a control computer that operates the beam-scanning system and performs automatic recognition of the smoke signature in the lidar signal on the basis of a neural-network algorithm. The scanning procedure is optimized for the given topography and other characteristics of the area under surveillance. The neural network is simulated or implemented as a co-processor. To cover wider areas, several lidar stations may be linked together in a network, which allows simultaneous scanning of the suspicious areas by several neighboring lidars in order to guarantee maximum efficiency and false alarm reduction. The system allows the detection and localization of fires earlier and farther than passive systems, whose sensitivity is lower.

20 Claims, 2 Drawing Sheets

U.S. PATENT DOCUMENTS 5,343,284 A  8/1994  Keeler et al.
5,961,314 A * 10/1999  Myhre et al. .................. 431/79

OTHER PUBLICATIONS

Arrue B C et al: "An Intelligent System for False Alarm Reduction in Infrared Forest-Fire Detection" IEEE Intelligent Systems, IEEE Computer Society, Los Alamitos, CA, US, May 2000, pp. 64-73, XP000957357 ISSN: 1094-7167 p. 64-p. 72.

* cited by examiner

LIDAR SYSTEM CONTROLLED BY COMPUTER FOR SMOKE IDENTIFICATION APPLIED, IN PARTICULAR, TO EARLY STAGE FOREST FIRE DETECTION

STATE OF THE ART OF THE INVENTION

While most of the available systems are passive this invention is concerned with a method and an active system for forest fire detection using lidar. Only a few former inventions use active systems for forest fire detection. However, they use uniaxial lidar configurations, which makes them inefficient, because the emitted beam and the backscattered radiation travel along the same path. The emitted and received radiation must be separated with a polariser, decreasing the optical efficiency. Furthermore, the system is more complicated, the scanning process is slower and the signal processing has low efficiency. The proposed system is simpler and does not use polarised radiation, so its efficiency is much higher, mainly due to the absence of overlapping between the emitted and backscattered radiation paths. One computerised unit using neural networks processes the backscattered radiation signal due to particles that cross the laser beam and identifies the smoke plume signal resulting from the fire. For wider areas under surveillance it is possible to connect and synchronise two or more lidar stations. If the stations are running in a network it is possible to evaluate and confirm events by triangulation, increasing the system efficiency and decreasing the risk of false alarms.

DESCRIPTION OF THE STATE OF THE ART

Forest fire detection may be done using passive or active methods. Active methods use lidar techniques while passive methods use either image processing, which allows the detection of smoke and flames, or static detectors, which measure flame radiation intensity, temperature, smoke density and composition. Active systems have several advantages, mainly the detection at larger distances and during the early stage of the fire.

Most patents, like DE4026676, U.S. Pat. No. 5,734,335, U.S. Pat. No. 5,422,484, U.S. Pat. No. 5,218,345, U.S. Pat. No. 5,049,756, U.S. Pat. No. 5,751,209, and U.S. Pat. No. 5,168,262, are related to passive systems that use static detectors. On the other hand, patents EP0984413, EP818766A1, U.S. Pat. No. 5,557,260, and WO9408660A1 describe special vision systems adapted to fire detection. Only two patents, U.S. Pat. No. 4,893,026 and EP978718A1, are devoted to active detection.

The USA patent U.S. Pat. No. 4,893,026 describes a lidar system capable of locating an object likely to diffuse back part of an incident laser beam. However, this lidar system is uniaxial, that is, the laser beam and the backscattered radiation pass along the same trajectory and it is necessary to use polarised radiation to separate the emitted and received light. The system has an optical unit that expands the laser beam, collects the backscattered radiation and separates it from the emitted beam and directs it to the detector for measuring. The system uses a pulsed Nd:YAG laser with an energy of 300 mJ per pulse and a pulse repetition rate between 5 Hz and 30 Hz. Angular scanning is performed by uniform rotation of the output mirror without any optimisation concerning the surrounding landscape. The use of a uniaxial lidar limits the detection efficiency due to polarisation losses and makes the system very expensive and difficult to maintain and operate. On the other hand the low flexibility of the scanning system limits its use in hilly landscapes. Without any experimental evidence, the authors claim a detection range of 20 km. On the contrary, the lidar proposed in the present patent has a biaxial optical system and a scanning procedure optimised according to the features of the surrounding landscape. Without polarisation of radiation, the proposed system is more efficient and easier to build and operate, and also enables fires to be detected at a earlier stage and at larger distances.

The European patent EP978718A1 is related to a biaxial lidar for smoke detection that does not have any scanning mechanism. Being intended for use in closed spaces, like tunnels and underground parking surveillance, the system has mirrors to reflect or scatter the laser beam in order to cover the surveillance area in a proper way. The mirrors may be flat or curved and they are usually fixed. The processing algorithm is inadequate for covering large areas.

The previously mentioned passive systems of static detectors operate on the basis of some optimised distribution of the sensors across the area under surveillance. The sensors detect particles, smoke, or thermal radiation due to burning. The passive systems based on video-camera supervision acquire images of the surveillance area that are compared with the reference images. Image processing uses several methods, such as filtering, overlapping, tracing, colour comparison, cluster recognition, etc. Some of the detecting systems have real time signal processing and use statistical or neural-network algorithms to improve the detection.

The present invention proposes a biaxial active detection system that uses backscaterred laser radiation. The sensitivity of this method is higher than that of the passive methods, allowing fires to be located at an early stage, when the passive detection is not yet possible. On the other hand, the system is cheaper and, from the viewpoint of construction and operation, simpler than the uniaxial lidar systems.

SUMMARY OF THE INVENTION

Figure 1:
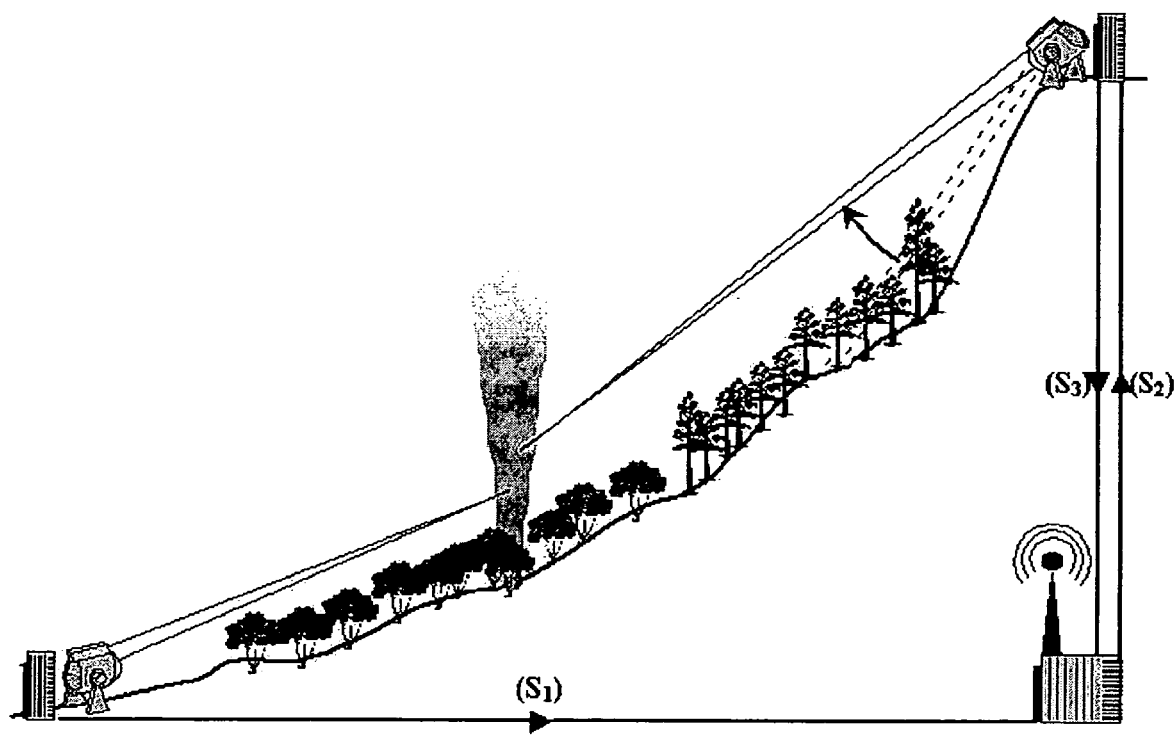
FIG. 1. Illustration of the operation of a surveillance network composed by two lidar stations and a command centre.

System for fire detection using biaxial laser radar controlled by computer, which includes a scanning laser beam device and a data processing unit monitored by a neural network.

DESCRIPTION OF THE INVENTION

The present invention describes a method and a system for detection and localisation of smoke, particularly suitable for early detection of forest fires. This active detection method is based on the lidar technology. It differs from the method proposed in the USA patent U.S. Pat. No. 4,893,026 (1985) in at least three aspects:

1). The proposed lidar station has a biaxial optical scheme, in which the emitted and the backscattered radiation travel different optical paths. For this reason the laser beam may be non-polarised and losses due to separation of emitted and collected radiation via polarisation are avoided. This difference makes the system more simple and efficient than the uniaxial architecture of the above-mentioned patent.

2). The computer control of the lidar station allows to optimise the scanning procedure for the given topography and other characteristics of the area under surveillance. For example, a high sampling density may be used in forest or inhabited regions. On the other hand, large rock and lake areas may be covered with a much lower sampling density. The consideration of statistical data on the previous fire occurrences allows to optimise the scanning procedure even more.

3). The use of a neural network reduces the probability of false alarms. For example, signals due to nearby chimney smoke can be included in the "no-alarm" part of the set with which the neural network is trained. Due to the nature of neural-network algorithms, no sophisticated preliminary signal preprocessing (such as smoothing, range adjustment, and logarithmic representation) is needed, which considerably simplifies signal processing and increases the speed of response.

In the simplest configuration, the lidar station proposed in the invention comprises a laser, an optical system with a receiver to capture the backscattered radiation and a detector, a data acquisition and signal preprocessing unit, and a computer for signal processing and analysis that operates the whole lidar station and performs, by means of specific software, external communications. The optical receiver includes a telescope, an adequate filter for the laser radiation used, and one or more diaphragms, while the detector may be a photomultiplier, a photoconductive element or an avalanche photodiode.

The laser periodically emits radiation pulses with a fixed wavelength in the range 0.2–12 µm. The radiation wavelength should be selected within one of the spectral windows of high atmospheric transmittance. The transmission window of the receiver's filter should be centred in the laser wavelength with a bandwidth from 0.1 to 10 nm. This optical element is used for filtering the background radiation. The energy pulses may be selected between 1 µJ and 1 J, with a repetition rate in the range 0.5 Hz–20 kHz. If necessary, the laser radiation wavelength may be changed with the help of an optical parametric oscillator, a nonlinear crystal, or a Raman cell. If the energy per square meter exceeds $5 \times 10^{-3}$ $J/m^2$ and the wavelength is in the band of high sensitivity of the human eye (0.4–1.4 µm), a beam expander must be used.

The data acquisition and signal preprocessing unit comprises an analog-to-digital converter (ADC) and other hardware necessary for signal treatment. In order to increase the signal to noise ratio, signals from successive laser pulses are accumulated. The specific number of signals to accumulate depends on the laser pulse energy, the repetition rate, and the wavelength. After accumulation, the resulting signal is analysed by the neural network.

The desired lidar signal recognition algorithm is derived by the neural network itself from examples which form the training set. For the "no-alarm" situation the training set includes a real scene of the surveillance area with all its peculiarities (hills, vegetation, smoking chimneys, etc.) for different weather conditions. For the "start-alarm" condition, the training set can combine computer-generated scenes with real fire signals.

When the lidar station detects smoke, the processing unit reports the characteristics of the fire, namely, the distance and the angular coordinates, and triggers the alarm. If a differential absorption lidar (DIAL) (based on the same biaxial architecture) is used, it is also possible to provide information on the chemical composition of the smoke.

When the surveillance system comprises only one lidar station it continuously scans the landscape by changing, via computer-controlled step motors, the azimuth and elevation angles. If a signal likely to be a smoke signature is detected, the system can re-scan the suspicious area in a more accurate way, in order to confirm the presence of the smoke plume.

In order to cover a large surveillance area, several lidar stations may be integrated in a network. In this situation, if one station detects the smoke plume, this event is reported to the automatic surveillance centre that instructs the neighbouring lidar stations to interrupt temporarily their routine scanning procedures and to verify the suspicious area for alarm validation. Finally, the surveillance centre analyses signals from different stations and, if necessary, emits the alarm signal.

Although the signal processing algorithms are very important for alarm detection, the signal to noise ratio (SNR) is a fundamental criterion for preliminary evaluation of the detection quality. Several experiments made by the authors have demonstrated that it is possible to detect small smoke plumes produced by campfires with a burning rate as little as 0.02 kg/s at distances as large as 6.5 km (notably, these plumes cannot be observed from the lidar position even with standard binoculars). The SNR of the detected plume signatures were in the range 50–160, depending on the atmospheric conditions and the background radiation.

Experimental Results

In order to test the viability of the present invention, a lidar station with the characteristics presented in Table 1 was designed, built, and tested.

TABLE 1

Parameters of the lidar station used in the experiments

| Parameter | Units of measurement | Value | |
|---|---|---|---|
| Laser: flashlamp-pumped, water-cooled, Q-switched Nd: YAG | | | |
| repetition rate | Hz | 12 | |
| pulse duration | ns | 10 | |
| beam divergence | mrad | <0.5 | |
| operating wavelengths | µm | 0.532 | 1.064 |
| pulse energy | mJ | 30 | 90 |
| Total transmitter efficiency | % | 90 | 90 |
| Receiver: Cassegrainian telescope, lens diameter 30 cm, focal length 156.2 cm | | | |
| effective area | $m^2$ | 0.0678 | |
| full angle of field of view | mrad | 0.9 | |
| Efficiency | % | 64 | 70 |
| Bandwidth | nm | 4.8 | 5 |
| photomultiplier FEU-83 with Peltier cooling | | | |
| dark current | A | $4 \cdot 10^{-7}$ | |
| Gain | | $\sim 10^5$ | |
| photocathode responsivity | $mA \cdot W^{-1}$ | 0.7 | 0.3 |
| data acquisition system IBM-compatible PC with ADC ISA board | | | |
| Range | km | 1–30 | |
| sampling distance (6.25 MHz) | m | 24 | |
| on-board data buffer | Kbyte | 64 | |

The experiments were made in Alentejo, in the south of Portugal, between the 27th of Sep. and the 7th of Oct. 2000; the experimental conditions are described in Table 2.

TABLE 2

Set of experimental conditions

|   | Date | Fuel Wood | Diameter of the fire site m | Burning rate Kg/s |
|---|---|---|---|---|
| a | Oct. 04, 2000, night | Olive | 0.8 | 0.018 |
| b | Oct. 05, 2000, day | Cedar tree | 1.0 | 0.028 |
| c | Oct. 05, 2000, night | Olive | 0.8 | 0.025 |
| d | Oct. 06, 2000, day | Cedar tree | 1.2 | 0.025 |
| e | Oct. 06, 2000, night | Olive | 0.9 | 0.023 |
| f | Oct. 07, 2000, day | Cedar tree | 1.2 | 0.033 |

Figure 2:
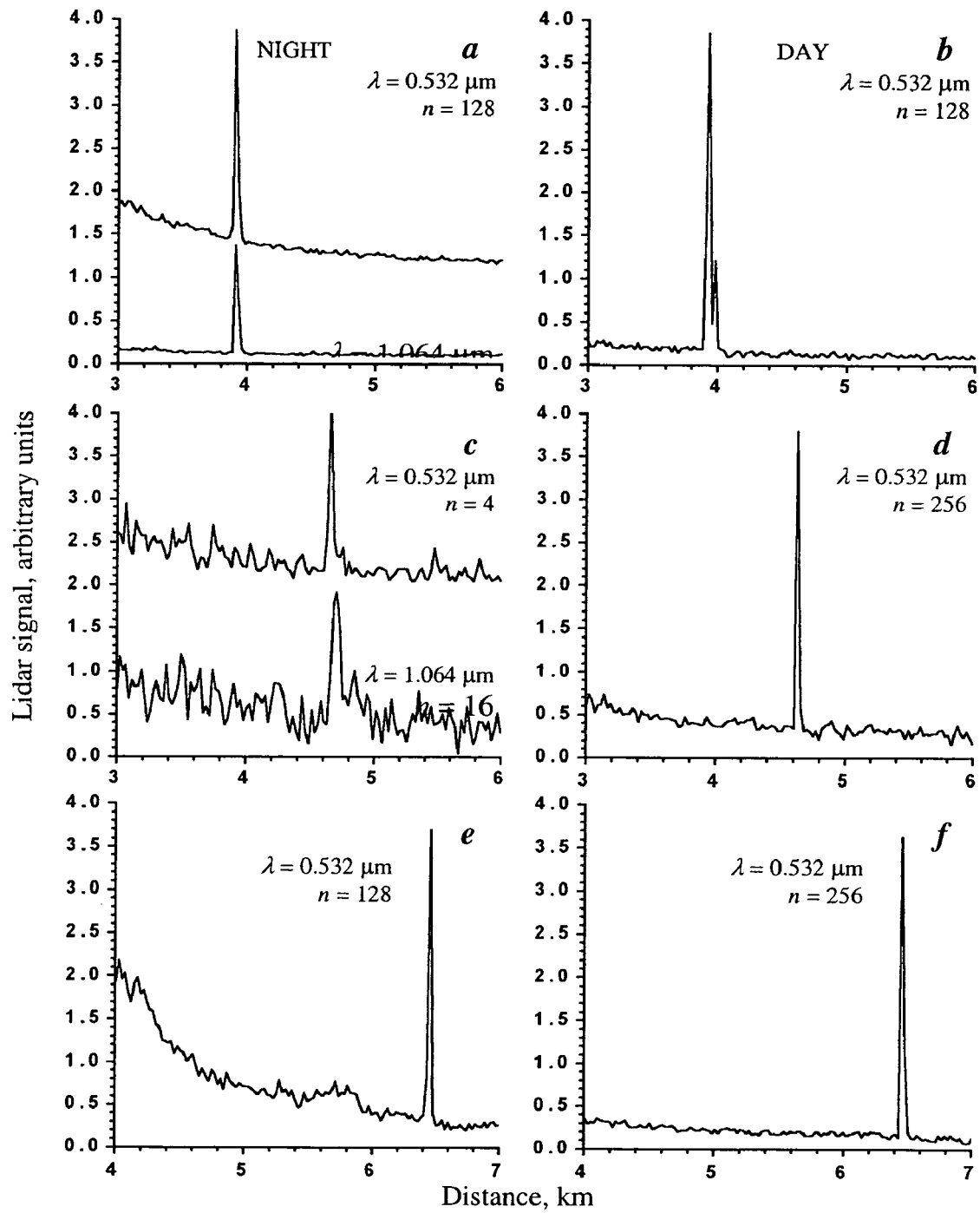
FIG. 2. Typical lidar signals obtained in experimental conditions (a–f) of Table 2. Parameter n indicates the number of lidar returns, accumulated in the signal curve.

During this period, more than 400 lidar signals were obtained. Some of them are illustrated in FIG. 2. In each experiment about 100 kg of wood were burnt during 50–90 min. Some experiments were made in daylight conditions (b, d and f), while others were performed during the night (a, c and e) in less favourable conditions characterised by higher humidity and in the presence of haze.

The values of SNR for different experimental conditions are presented in Table 3.

TABLE 3

Signal-to-noise ratio measured in different experimental conditions

| Experimental conditions | Number of accumulated lidar signals | Wavelength µm | Distance to the plume km | Signal-to-noise ratio (SNR) |
|---|---|---|---|---|
| a | 128 | 1.064 | 3.90 | 90 |
| a | 128 | 0.532 | 3.90 | 70 |
| b | 128 | 0.532 | 3.90 | 130 |
| c | 4 | 0.532 | 4.66 | 23 |
| c | 8 | 0.532 | 4.66 | 32 |
| c | 16 | 1.064 | 4.66 | 8.2 |
| c | 256 | 0.532 | 4.66 | 89 |
| e | 128 | 0.532 | 6.45 | 49 |
| f | 256 | 0.532 | 6.45 | 160 |

In all the situations the signal is so strong that no further signal processing is needed to provide evidence of the smoke-plume presence. The field tests clearly demonstrated that it is possible to detect smoke plumes of forest fires in early stages, even when the burning rate is as low as 0.02 kg/s, up to a distance greater than 6.5 km. Calculations performed by the authors on the basis of lidar modelling and experimental tests demonstrated that in the case of satisfactory atmospheric conditions and with a signal-to-noise ratio greater than 5 the detection range of the system exceeds 20 km.

The invention claimed is:

1. A method for detection and location of smoke, characterised by the use of a biaxial lidar station comprising:
    transmitting a pulsed laser source of a probing beam, with the energy of 1 µJ–1 J per pulse, repetition rate of 0.5 Hz–20 kHz, and the wavelength in the range 0.2–12 µm;
    collecting the backscattered radiation with a telescope;
    suppressing of the background radiation with an optical filter having a transmittance window of 0.1–10 nm spectral width, centred at the wavelength of the emitted laser radiation;
    measuring the collected radiation with a photodetector;
    controlling a diaphragm for control of the detector aperture;
    controlling a beam scanning with a computer controlled unit;
    controlling a detector signal with an analog-to-digital converter synchronised with a laser shutter, which transforms the detector signal and sends it to a memory unit;
    accumulating the lidar returns resulting from the backscattering from each laser pulse in said memory unit;
    processing and analyzing the lidar signal and identification of eventual smoke plumes, based on a neural network algorithm, in which the neural network is simulated or implemented as a co-processor;
    performing overall control of the system in the following aspects: (i) analyses the messages of the signal-processing software and, if necessary, activates the alarm; (ii) controls the azimuth and elevation step motors in order to realise optimised scanning procedure with respect to the azimuth and elevation angles; (iii) if necessary, modifies the scanning procedure and other system parameters.

2. Method, in accordance with claim 1, characterised by providing eye-safety conditions by one of the following ways: operation at a eye-safe laser wavelength, expansion of the laser beam, decrease of the laser power with simultaneous increase of the pulse repetition rate.

3. Method as defined in claims 1, wherein optical parametric oscillator, or optical crystal, or system of optical crystals, or Raman gas cell is used to change the laser wavelength, mainly for the sake of eye-safety.

4. Method as defined in claim 1, further comprising incorporating two or more lidar stations, monitoring adjoining and/or partially overlapping surveillance areas, into a network with a central data-processing, control, and decision-making unit and connecting the stations to common reference databases: if one lidar station detects an object likely to be a smoke plume, it sends an alarm signal to the central unit that directs the scanning procedures of the neighbouring lidar stations to the treatment of the suspicious area, then, after obtaining additional data, the central unit analyses the result and, if the presence of the smoke is confirmed, generates the final alarm signal.

5. Method as defined in claim 1, further comprising using several laser wavelengths simultaneously in order to analyse chemical properties in the detected plume, using differential absorption lidar (DIAL) with a biaxial architecture.

6. Method as defined in claim in which the system is applied, in particular, to early detection and location of forest fires and the data-processing software provides relevant characteristics of the fire.

7. Method as defined in claim 2, wherein optical parametric oscillator, or optical crystal, or system of optical crystals, or Raman gas cell is used to change the laser wavelength, mainly for the sake of eye-safety.

8. Method as defined in claim 2, further comprising monitoring with two or more lidar stations, adjoining and/or partially overlapping surveillance areas, which are incorporated into a network with a central data-processing, control, and decision-making unit and are connected to common reference databases: if one lidar station detects an object likely to be a smoke plume, such that it sends an alarm signal to the central unit that directs the scanning procedures of the neighbouring lidar stations to the treatment of the suspicious area, then, after obtaining additional data, the central unit analyses the result and, if the presence of the smoke is confirmed, generates the final alarm signal.

9. Method as defined in claim 3, further comprising monitoring with two or more lidar stations, adjoining and/or partially overlapping surveillance areas, which are incorporated into a network with a central data-processing, control, and decision-making unit and are connected to common reference databases: if one lidar station detects an object likely to be a smoke plume, such that it sends an alarm signal to the central unit that directs the scanning procedures of the neighbouring lidar stations to the treatment of the suspicious area, then, after obtaining additional data, the central unit analyses the result and, if the presence of the smoke is confirmed, generates the final alarm signal.

10. Method as defined in claim 7, further comprising monitoring with two or more lidar stations, adjoining and/or partially overlapping surveillance areas, which are incorporated into a network with a central data-processing, control, and decision-making unit and are connected to common reference databases: if one lidar station detects an object likely to be a smoke plume, such that it sends an alarm signal to the central unit that directs the scanning procedures of the neighbouring lidar stations to the treatment of the suspicious area, then, after obtaining additional data, the central unit analyses the result and, if the presence of the smoke is confirmed, generates the final alarm signal.

11. Method as defined in claim 2, further comprising using several laser wavelengths simultaneously in order to analyse chemical properties in the detected plume, using differential absorption lidar (DIAL) with a biaxial architecture.

12. Method as defined in claim 3, further comprising using several laser wavelengths simultaneously in order to analyse chemical properties in the detected plume, using differential absorption lidar (DIAL) with a biaxial architecture.

13. Method as defined in claim 4, further comprising using several laser wavelengths simultaneously in order to analyse chemical properties in the detected plume, using differential absorption lidar (DIAL) with a biaxial architecture.

14. Method as defined in claim 7, further comprising using several laser wavelengths simultaneously in order to analyse chemical properties in the detected plume, using differential absorption lidar (DIAL) with a biaxial architecture.

15. Method as defined in claim 8, further comprising using several laser wavelengths simultaneously in order to analyse chemical properties in the detected plume, using differential absorption lidar (DIAL) with a biaxial architecture.

16. Method as defined in claim 9, further comprising using several laser wavelengths simultaneously in order to analyse chemical properties in the detected plume, using differential absorption lidar (DIAL) with a biaxial architecture.

17. Method as defined in claim 10, further comprising using several laser wavelengths simultaneously in order to analyse chemical properties in the detected plume, using differential absorption lidar (DIAL) with a biaxial architecture.

18. Method as defined in claim 2, the system is applied, in particular, to early detection and location of forest fires and the data-processing software provides relevant characteristics of the fire.

19. Method as defined in claim 3, the system is applied, in particular, to early detection and location of forest fires and the data-processing software provides relevant characteristics of the fire.

20. Method as defined in claim 4, the system is applied, in particular, to early detection and location of forest fires and the data-processing software provides relevant characteristics of the fire.

* * * * *